Nov. 29, 1955  W. P. PAULSEN ET AL  2,725,243
LIFTING DRAWBAR FOR TRACTORS
Filed May 18, 1953  2 Sheets-Sheet 1

INVENTORS WILLIAM P. PAULSEN
CONRAD EKLE by: Lucas J. DeKoster
THEIR ATTORNEY

Nov. 29, 1955 W. P. PAULSEN ET AL 2,725,243
LIFTING DRAWBAR FOR TRACTORS
Filed May 18, 1953 2 Sheets-Sheet 2

INVENTORS WILLIAM P. PAULSEN
CONRAD EKLE by: *Lucas J. D'Koter*
THEIR ATTORNEY

# United States Patent Office 2,725,243
Patented Nov. 29, 1955

2,725,243

LIFTING DRAWBAR FOR TRACTORS

William P. Paulsen and Conrad Ekle, Canton, S. Dak.

Application May 18, 1953, Serial No. 355,764

14 Claims. (Cl. 280—478)

This invention pertains to tractor drawbars and more particularly to a drawbar for a farm tractor which is adapted to lift the heavy tongue of a farm implement from its position on the ground to the pulling position simply by the motion of the tractor.

Many farm implements such as combines, disc harrows, spreaders and the like are drawn by tractors by means of a tongue attached to the implement. These tongues on such implements as mentioned are required to support a considerable part of the weight of the implement. Thus when the implement is detached from the tractor the tongue must either be supported by some sort of jack means or a support leg, or else it must be dropped to the ground and be raised again when the implement is to be used. In general, the implements are merely dropped to the ground. Support legs have been used, but generally they have not been satisfactory except for the simplest type which requires a considerable amount of work to raise the tongue by means of a screw jack. Lifting the tongue of such an implement is very heavy work and also submits the lifter to the danger of rupture or the like.

Our invention makes possible the easy and convenient attachment of such heavy implements to a tractor while the tongue is on the ground or very near thereto, and then simply by pulling the tractor forward, the tongue is automatically carried up and latched in a normal pulling position. Our device also makes easier the coupling of such devices as trailers and wagons which have a light tongue, but may be a little difficult to get into position for coupling. All of these advantages are accomplished by a device which can be adapted for use to almost any make of tractor whether it has an hydraulic lift system or not, without the use of any of the tractor's power, except that normally used in pulling the implement. Our device is a full replacement for the ordinary drawbar used on the usual farm tractor and has no complex mechanism which can get out of order, while still being rugged and strong and fully operative.

More specifically, and in reference to the drawings in which.

Figure 1:
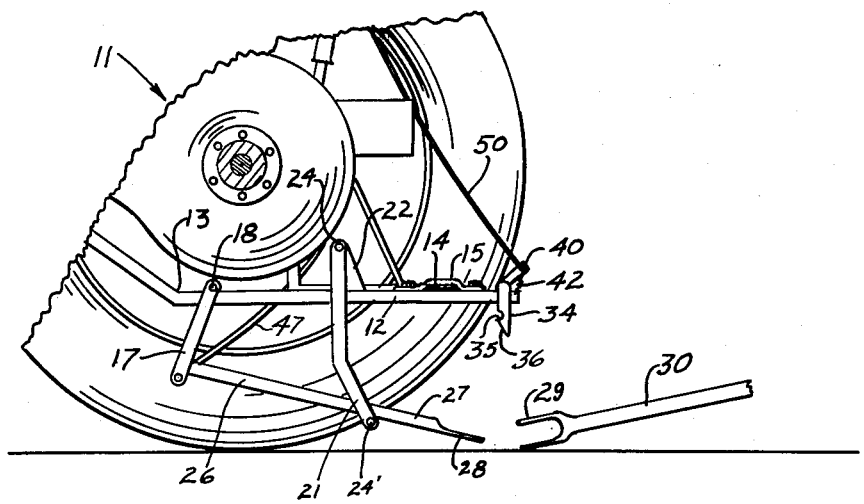
Fig. 1 is an elevational view of our device in a lowered position as attached to a tractor.

Briefly, our device is a drawbar for use principally with farm tractors but not necessarily restricted thereto. It is designed principally to be a replacement for the standard drawbar as provided by the manufacturer of the tractor, and has all of the facilities of such standard drawbars. In addition to the customary uses of such drawbars, our device when connected to the tongue of any farm implement will lift the tongue from its lower or resting position on the ground to an upper or pulling position by means of a swinging linkage, including two swinging links and a secondary bar. This lifting is accomplished merely by pulling the tractor forward. The secondary bar may be latched in its upward or pulling position, and when so latched, the entire drawbar may be used in the same manner as the bar which it replaces. Means operable from the seat of the tractor are provided for the release of the latch so that the heavy tongue may be lowered easily. Means are also provided to allow some adjustment of the position of the lower or secondary bar so that it may be effectively moved into the proper position for attachment with the tongue of the implement.

More specifically and with reference to the drawings, our device is adapted to be connected to a farm tractor 11, one type of which is illustrated although the device is, by no means, restricted to any particular type of draft power. The drawbar comprises an upper or main bar 12 which is preferably formed of a channel section with a web and a pair of flanges forming a downward-facing channel. This main bar may be bent or fabricated to a bent shape as at 13 to provide for attachment at its forward end by means not shown. This may be necessary for some tractors and not for others, and forms no part of our invention. In order to provide additional adaptability it is envisioned that an adjustable upper bar 12' (Figs. 2 and 4) may be used. In this bar, a telescoping member 9 is provided having a series of spaced holes 8. By fastening bolts 7 thru selected holes 8 it will be possible to extend or retract the length of the bar 12' in a series of steps. In the type of tractor illustrated, sector means 14 are provided to which the normal drawbar is slidably connected, and our device may also be similarly connected thereto by means of a yoke 15 between which and the principal bar 12, the sector is embraced loosely. Bolts 16 are provided so that the yoke may be removed when it is desired to remove the drawbar from the tractor.

Figure 4:
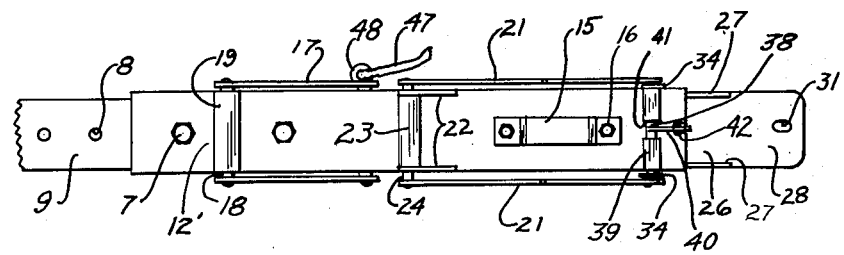
Fig. 4 is a plan view of our device as in Fig. 2 and to the same scale.

Near the bend 13 in the device shown and towards the forward end of any other similar drawbar adapted to fit other tractors, a pair of forward links 17 are pivotally mounted on the upper bar 12. Any type of mounting may be used, but preferably the two links are coupled together in the mounting as is best shown in Fig. 4. As there shown, the links are welded to an axle 18 which extends through a bearing mounting 19 which may take the form of a simple tube or journal bearing since there is no high-speed relative movement of any sort although there may be fairly high pressures. All that is required of the links is that they swing fairly smoothly in relation to the main bar 12, and carry the required load.

Towards the rear from the mounting for the front links 17, we provide a mounting for a pair of rear links 21. This mounting comprises a bracket or pair of brackets 22 welded or otherwise fastened or formed to the main bar 12 and extending substantially above that bar. These brackets also support a tube or bearing mounting 23 similar to the mounting 19 and through which extends an upper rear axle 24. The rear links 21 are attached to this axle 24 in the same manner as the front links are attached to the upper front axle 18. It will be noted that the rear links 21 are considerably longer than the front links 17. This has a purpose as will be later explained and this provides one of the advantages of our device. It may also be noted that in the illustrated device, the rear links are bent. This is for the principal purpose of clearing the sector 14 as may be seen in Fig. 2, and is not necessary to the operation of the device.

Figure 2:
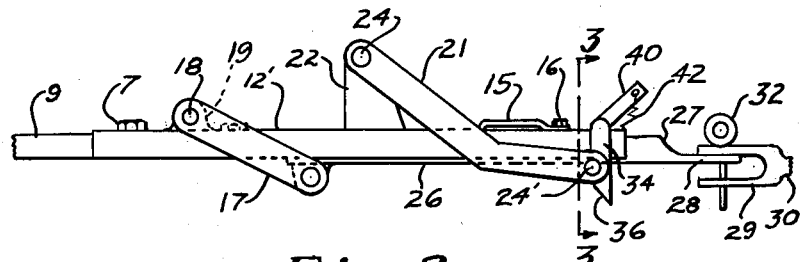
Fig. 2 is an elevational view, drawn to a somewhat enlarged scale, of our device removed from the tractor and in a raised position showing a slight modification.

A lower or secondary bar 26 is pivotally mounted to the lower ends of the links 17 and 21 preferably by axle and bearing tube means similar to those used at the upper ends of these links. The lower bar 26 is preferably formed from a channel section of such size that the flanges 27 on the channel will fit between the flanges of the upper bar 12 and with the channel facing upward. The pivotal mountings of the links 17 and 21 are spaced on this bar so that the lower bar may be swung up between the flanges of the upper bar in a nested position substantially horizontal as shown in Fig. 2. This is of considerable importance because, since the front links 17 are shorter than the rear links 21, the rear end 28 of the lower bar 26 describes a considerably larger arc than the front end. It is thus important that the spacing of the links on the lower bar be set when the two bars are in their nested or juxtaposed position. The rear end 28 of the lower bar 26 is tapered down by removing the flanges 27 from the channel section to provide a flat bar portion which may easily be slid between the forked end 29 of the tongue 30 (Fig. 1) of any implement to which it is desired to connect the tractor. A somewhat slotted hole 31 (Fig. 4) is provided in the flat portion 28 through which a pin 32 of the usual type may be inserted for the connection of the tongue to the drawbar.

Figure 3:
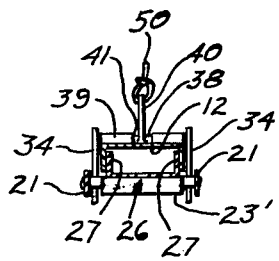
Fig. 3 is a sectional view along line 3—3 of Fig. 2.

Latch means to hold the lower bar 26 in its raised or juxtaposed position is provided as best shown in Figs. 2 and 3. This means comprises a pair of latch members 34 shaped to provide a hooked opening 35 (Fig. 1) and a tapered end 36 which provides a striking surface to push the latch toward the rear as will later become evident. These members 34 are attached to an axle 38 which is pivotally mounted in a bearing member or tube 39 fixed to the upper bar 12. This tube 39 is slotted near its center or may be formed of two tubes to provide an opening 41 through which a release lever 40 extends. This lever is also fixed to the axle 38 so that the lever 40, axle 38, and latch members 34 operate as a unit. Spring means 42 are connected between the lever 40 and the upper bar 12 so as to pull the lever downwards which in turn urges the members 34 in a direction toward the front of the device. A stop means to limit this movement may be effectively provided by properly proportioning the slot 41 or by fixing the lever 40 to the axle 38 in such a position that the lever 40 will engage the upper surface of the bar 12 at such a position to limit the movement of the latch members. The latch members are positioned and proportioned so that the openings 35 may engage and hold the lower axle 24' or its bearing housing 23' in its upper position and may therefore latch the lower bar 26 in its upward position which is the normal pulling position of the unit. It will be seen that the upper and lower rear axles 24 and 24' are slightly longer than the front axles 18 so that the latch members may properly engage them.

Figure 5:
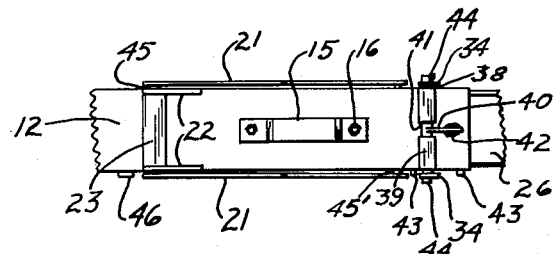
Fig. 5 is a partial plan view of our device showing the slight modifications.
Figure 6:
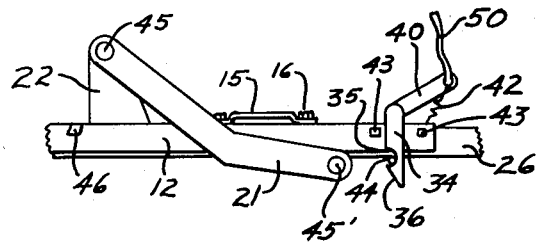
Fig. 6 is a partial elevational view of the device of Fig. 5.

A somewhat modified and preferred embodiment is shown in Figs. 5 and 6. In this embodiment, the latch members 34 are mounted slightly to the rear of their location in the previous described device, and a latch bar 44 is provided on the lower bar 26. This allows the use of shorter rear axles 45 and 45' with the resultant benefit of reduced free lateral motion of the lower bar on the rear axle. Auxiliary stop members 43 are fixed to the bar 12 in this embodiment to limit the movement of the latch members 34 in both directions. These may be pins or blocks fixed to the bar by welding or any other convenient means. A similar block 46 is used to limit the forward movement of the rear links 21 so that they will not swing violently and so that any type of automatic coupling may be used. In its other details this embodiment may be like that previously described.

The operation of our device is relatively simple. With the lower bar 26 in its lower position as shown in Fig. 1, the tractor is backed toward the tongue 30 of the desired implement in the usual manner. Since the flat end 28 of the lower bar is very near the ground it may be moved right between the forks 29 on the end of the tongue 30. However, in order to use our device conveniently where there might be some irregularity in the ground surface or where the tongue 30 is propped up somewhat on a clod of dirt or some article, we provide means for controlling the height of the lower bar within limits so that the hitch may be easily effected. This means comprises a rope 47 fastened to a ring 48 on one forward link 17 at its lower end (Fig. 4). This rope 47 passes rearward and upward to a position where the operator of the tractor can grasp it (Fig. 1), and by pulling thereon can cause the links 17 to swing the lower bar 26 upward. Thus by pulling on the rope, the bar 26 can be raised to whatever position necessary for the end 28 to be moved between the forked ends 29 of the tongue 30.

After the end 28 is properly positioned relative to the forked end 29, the pin 32 is dropped into place to couple the tongue to the drawbar. The slotted hole 31 will take care of any misalignment caused by the differences in slope of the two devices. Then the tractor is moved forward. The weight and inertia of the implement will cause it to stay still as the tractor moves thus swinging the linkage formed by the links 17 and 21 and the lower bar 26, rearwardly and upward so that the part to be caught strikes the tapered end 36 moving the latch members 34 until they catch either the axle 24', the housing 23' or the latch bar 44 dependent on which modification is used and hold the upper bar in its raised position where it is held while the implement is being pulled. It will be noted that as the links move upward, there will be a fairly heavy weight on the end 28 of the lower bar. This tends to pivot the lower bar 26 about the axle 24' with a resultant upward force on the front links 17 tending to move them up and rearwardly which is the desired direction of movement. Thus the weight of the tongue assists the movement of that part of the linkage.

It will also be noted that because of the brackets 22 which support the rear links above the upper bar 12, the rearward pull on the lower bar always has a fairly large upward component at the rear links which tends to swing the links upward. Combined with the pivoting action of the weight of the tongue 30 tending to raise the front links, this assures that the bars will always be swung up together to a pulling position. In tests of our device with various types of implements this has always proved to be the case. Even with devices having very heavy loads on the tongue such as combines or disc harrows, the tongue has been lifted to a latched position without any outside assistance and without any need for jerking the tractor. Tests with easy rolling devices such as empty trailers and the like have also proved that the device will work on such implements.

To release the latch and drop the tongue down to a position where it can be uncoupled easily is also a simple matter. When the implement is driven to the place where it is to be parked, the latch members 34 are released by pulling a rope 50 which is attached to the lever 40 and is trained up toward the seat of the operator of the tractor. This pull moves the lever 40 and consequently the members 34 to release the axle 24' or the bar 44 from the openings 35 and allow the tongue to drop. In the case of a heavy tongue which may cause considerable friction on the latch members so that it would be difficult to release them, a little tension in the drawbar caused by pulling a little with the tractor is sufficient to raise the tongue and relieve the friction so that the latches may be easily released.

In connection with devices such as trailers or wagons where the tongue is relatively light, but where the wagon itself may be fairly heavily loaded our device has another use. Wagons are probably the one device most often connected and disconnected from a tractor, and often it is desirable to connect and disconnect them as quickly as possible. Our device is well adapted to making the coupling of wagons a much easier and quicker operation than with the ordinary drawbar. With the former drawbars, the weight of the wagon tongue was no particular problem, but the tractor had to be backed up to the wagon in just the right position so that the draft pin would drop through the holes in the drawbar and the wagon tongue. This required some maneuvering oftentimes to get the proper alignment. With our device we have eliminated much of the need for precision of this sort.

It will be noted from the drawings that the end 28 of our device has considerably fore-and-aft movement from its lower to its upper position. Thus if the tractor is backed up somewhere near where it should be in order to couple it to the wagon, the lower bar 26 can be raised or lowered and therefore moved forward or backward a considerable distance to align the hole 31 with the holes in the fork of the wagon tongue. Thus merely by movement of the lower bar 26, the holes can be readily aligned insofar as fore-and-aft position is concerned. Lateral position can ordinarily be taken care of by turning the wagon tongue a little to one side or the other, so that the coupling is accomplished with the least amount of maneuvering of the tractor and therefore with a considerable saving of time. It is then necessary only to pull away, and the drawbar will automatically latch in its pulling position. We believe it will be evident to those skilled in the art that our device represents a considerable advance over the previous drawbars known to the art.

Having thus described our invention in its embodiments, we do not wish to be limited to those embodiments, but recognize that many variations and substitutions may be made without going beyond the scope of our invention as described and limited only by the following claims.

We claim:

1. A drawbar adapted to couple a pulling device to a pulled device having a draft tongue, comprising an upper bar means adapted to be fixed to said pulling device, front link means mounted on a pivotal mounting on said upper bar, rear link means mounted on said bar by a pivotal mounting supported substantially above said pivotal mounting for said front link means, a lower bar adapted to be coupled to said draft tongue and pivotally connected to said link means whereby said lower bar is adapted to be swung from a lower position to a raised position by longitudinal movement of said upper bar while said lower bar is not longitudinally moved.

2. A drawbar adapted to couple a pulling device to a pulled device having a draft tongue, comprising an upper bar means adapted to be fixed to said pulling device, front link means mounted on a pivotal mounting on said upper bar, rear link means mounted on said bar by a pivotal mounting supported substantially above said pivotal mounting for said front link means, a lower bar adapted to be coupled to said draft tongue and pivotally connected to said link means whereby said lower bar is adapted to be swung from a lower position to a raised position by longitudinal movement of said upper bar while said lower bar is not longitudinally moved, and latch means on said upper bar adapted to engage catch means on said lower bar to hold said lower bar in its raised position.

3. A drawbar for a tractor adapted to be coupled to a pulled device comprising an upper bar means fixed to said tractor, a lower bar adapted to be coupled at one end to said pulled device and having an upper position wherein said lower bar is in close juxtaposition to and beneath said upper bar, linkage means comprising at least two sets of links coupled between said upper and said lower bars, said sets of links being of unequal length but proportioned so that said lower bar will lie in said upper position and will drop to a lower position wherein the coupling end of said lower bar will be close to the surface on which said tractor is standing.

4. A drawbar for a tractor adapted to be coupled to a pulled device comprising an upper bar means fixed to said tractor, a lower bar adapted to be coupled at one end to said pulled device and having an upper position wherein said lower bar is in close juxtaposition to and beneath said upper bar, linkage means comprising at least two sets of links coupled between said upper and said lower bars, said sets of links being of unequal length but proportioned so that said lower bar will lie in said upper position and will drop to a lower position wherein the coupling end of said lower bar will be close to the surface on which said tractor is standing, said links being positioned on said bars so that a forward movement of said upper bar while said lower bar is held in a fixed fore-and-aft position will cause said lower bar to be moved upward to said upper position, and latch means on said upper bar adapted to engage catch means on said lower bar to hold said lower bar in said upper position.

5. A drawbar for coupling a tractor to the tongue of a pulled device and adapted to raise said tongue automatically from a resting position to a pulling position comprising an upper bar fixed to said tractor, front links pivoted to said bar substantially at the upper surface of said bar, bracket means mounted on said bar extending upwardly therefrom, rear links pivotally mounted on said bracket means at a position substantially above said bar, said rear links being longer than said front links, a lower bar pivotally connected to said front and rear links, the connection between said links and said lower bar being such that said lower bar will lie in close parallel juxtaposition to said upper bar in an upper position, said lower bar being movable from said upper position to a lower position wherein the rear end of said lower bar is near the surface on which said tractor is standing.

6. For a tractor having an operator's seat, a drawbar for coupling a tractor to the tongue of a pulled device and adapted to raise said tongue automatically from a resting position to a pulling position comprising an upper bar fixed to said tractor, front links pivoted to said bar substantially at the upper surface of said bar, bracket means mounted on said bar extending upwardly therefrom, rear links pivotally mounted on said bracket means at a position substantially above said bar, said rear links being longer than said front links, a lower bar pivotally connected to said front and rear links, the connection between said links and said lower bar being such that said lower bar will lie in close parallel juxtaposition to said upper bar in an upper position, said lower bar being movable from said upper position to a lower position wherein the rear end of said lower bar is near the surface on which said tractor is standing, flexible means connected to said lower bar trained towards said operator's seat whereby said lower bar may be adjustably swung by pulling on said flexible means.

7. A drawbar for coupling a tractor to the tongue of a pulled device and adapted to raise said tongue automatically from a resting position to a pulling position comprising an upper bar fixed to said tractor, front links pivoted to said bar substantially at the upper surface of said bar, bracket means mounted on said bar extending upwardly therefrom, rear links pivotally mounted on said bracket means at a position substantially above said bar, said rear links being longer than said front links, a lower bar pivotally connected to said front and rear links, the connection between said links and said lower bar being such that said lower bar will lie in close parallel juxtaposition to said upper bar in an upper postion, said lower bar being movable from said upper position to a lower position wherein the rear end of said lower bar is near the surface on which said tractor is standing, and latch means on said upper bar adapted to engage means on said lower bar to hold said lower bar in said upper position, lever means on said latch means, spring means connected between said lever means and said upper bar urging said latch means to a latched position, flexible means connected to said lever means whereby a pull on said flexible means will move said latch means to a release position.

8. For a tractor having an operator's seat, a drawbar for coupling a tractor to the tongue of a pulled device and adapted to raise said tongue automatically from a resting position to a pulling position comprising an upper bar fixed to said tractor, front links pivoted to said bar substantially at the upper surface of said bar, bracket means mounted on said bar extending upwardly therefrom, rear links pivotally mounted on said bracket means at a position substantially above said bar, said rear links being longer than said front links, a lower bar pivotally connected to said front and rear links, the connection between said links and said lower bar being such that said lower bar will lie in close parallel juxtaposition to said upper bar in an upper position, said lower bar being movable from said upper position to a lower position wherein the rear end of said lower bar is near the surface on which said tractor is standing, flexible means connected to said lower bar trained towards said operator's seat whereby said lower bar may be adjustably swung by pulling on said flexible means, and latch means on said upper bar adapted to engage means on said lower bar to hold said lower bar in said upper position, lever means on said latch means, spring means connected between said lever means and said upper bar urging said latch means to a latched position, flexible means connected to said lever means whereby a pull on said flexible means will move said latch means to a release position.

9. For coupling a tractor to the tongue of a pulled device, a drawbar adapted to raise said tongue from a resting position to a pulling position as said tractor starts pulling said pulled device, comprising an upper bar adapted to be fixed to said tractor, front links having one end pivotally mounted substantially on the upper surface of said bar, a lower bar pivotally connected to the other end of said links, bracket means on said upper bar rearward of said front links and extending above said upper bar, rear links substantially longer than said front links pivotally connected at one end to the upper part of said brackets, said rear links being also pivotally connected at the other ends to said lower bar, said lower bar being thereby adapted to swing from a lower position wherein one end approaches the surface on which said tractor is standing to a raised position in close parallel juxtaposition to said upper bar, latch means on said upper bar including a release lever, and cross bar means on said lower bar engageable by said latch means to hold said lower bar in its raised position.

10. For coupling a tractor to the tongue of a pulled device, a drawbar adapted to raise said tongue from a resting position to a pulling position as said tractor starts pulling said pulled device, comprising an upper channel bar adapted to be fixed to said tractor and formed of a web and flanges, said flanges extending downwardly from said web, front links pivotally mounted on said bar, bracket means on said bar and extending upwards therefrom, rear links pivotally mounted to said bracket means, said rear links being substantially longer than said front links, a lower bar also formed of a web and flanges, the flanges of said lower bar being spaced so as to fit within the flanges of said upper bar to allow said lower bar to lie in a nested upper position relative to said upper bar, said front and rear links being pivotally connected to said lower bar to allow said lower bar to swing from its nested position to a lower position wherein one end of said lower bar approaches the surface on which said tractor is standing, latch means on said upper bar and catch means on said lower bar, said latch means being engageable with said catch means to hold said lower bar in its upper nested position.

11. For coupling a tractor to the tongue of a pulled device, a drawbar adapted to raise said tongue from a resting position to a pulling position as said tractor starts pulling said pulled device comprising an upper bar adapted to be fixed to said tractor, upper bearing means fixed on said upper bar, first axle means journalled in said bearing means, front links fixed to said axle means, bracket means mounted on said upper bar and extending substantially thereabove, upper rear bearing means fixed to said bracket means, second axle means journalled in said rear bearing means, rear links substantially longer than said front links fixed to said second axle means, a lower bar, lower front and rear bearing means mounted on said lower bar, axle means journalled in each of said lower bearing means, said front links being fixed to the axle means in said lower front bearing means, and said rear links being fixed to the axle in said lower rear bearing means, whereby said lower bar may be swung from a lower position wherein one end of said lower bar approaches the surface on which said tractor is standing to an upper position wherein said lower bar lies in close parallel juxtaposition to said upper bar.

12. For coupling a tractor to the tongue of a pulled device, a drawbar adapted to raise said tongue from a resting position to a pulling position as said tractor starts pulling said pulled device, comprising an upper bar adapted to be fixed to said tractor, front links having one end pivotally mounted substantially on the upper surface of said bar, a lower bar pivotally connected to the other end of said links, bracket means on said upper bar rearward of said front links and extending above said upper bar, rear links substantially longer than said front links pivotally connected at one end to the upper part of said brackets, said rear links being also pivotally connected at their other ends to said lower bar, said lower bar being thereby adapted to swing from a lower position wherein one end approaches the surface on which said tractor is standing to a raised position in close parallel juxtaposition to said upper bar, stop means on said upper bar in position to engage at least one of said rear links at substantially said lower position to prevent over swing of said rear links, latch means on said upper bar including a release lever, and cross bar means on said lower bar engageable by said latch means to hold said lower bar in its raised position.

13. For coupling a tractor to the tongue of a pulled device, a drawbar adapted to raise said tongue from a resting position to a pulling position as said tractor starts pulling said pulled device, comprising an upper bar adapted to be fixed to said tractor, front links having one end pivotally mounted substantially on the upper surface of said bar, a lower bar pivotally connected to the other end of said links, bracket means on said upper bar rearward of said front links and extending above said upper bar, rear links substantially longer than said front links pivotally connected at one end to the upper part of said brackets, said rear links being also pivotally connected at their other ends to said lower bar, said lower bar being thereby adapted to swing from a lower position wherein one end approaches the surface on which said tractor is standing to a raised position in close parallel juxtaposition to said upper bar, stop means on said upper bar in position to engage at least one of said rear links at substantially said lower position to prevent over swing of said rear links, latch means on said upper bar including a release lever, and cross bar means on said lower bar engageable by said latch means to hold said lower bar in its raised position, and stop means on said upper bar on either side of said latch means to prevent said latch means from swinging too far in either of two opposite directions.

14. A drawbar for coupling a tractor to the tongue of a pulled device and adapted to raise said tongue automatically from a resting position to a pulling position comprising adjustable upper bar means adapted to be fixed to said tractor, front links pivoted to said bar substantially at the upper surface of said bar, bracket means mounted on said bar extending upwardly therefrom, rear links pivotally mounted on said bracket means at a position substantially above said bar, said rear links being longer than said front links, a lower bar pivotally connected to said front and rear links, the connection between said links and said lower bar being such that said lower bar will lie in close parallel juxtaposition to said upper bar in an upper position, said lower bar being movable from said upper position to a lower position wherein the rear end of said lower bar is near the surface on which said tractor is standing.

References Cited in the file of this patent

UNITED STATES PATENTS

| | | |
|---|---|---|
| 2,194,087 | Jager | Mar. 19, 1940 |
| 2,320,168 | Benjamin | May 25, 1943 |
| 2,549,734 | White | Apr. 17, 1951 |
| 2,685,456 | Black | Aug. 3, 1954 |